Oct. 31, 1950  H. C. WATSON  2,527,691
PLOTTING DISK
Filed April 30, 1948

INVENTOR.
Hugh C. Watson,
BY
Wilkinson Huxley Byron + Hume
attys.

Patented Oct. 31, 1950

2,527,691

UNITED STATES PATENT OFFICE 2,527,691

PLOTTING DISK

Hugh C. Watson, Chicago, Ill.

Application April 30, 1948, Serial No. 24,202

3 Claims. (Cl. 33—1)

1

The present invention relates to an instrument for plotting successive bearings and distances and which is particularly adapted for the following uses: plotting a course in a small sail or power boat; plotting a course in a land vehicle over any kind of terrain with or without existing roads; plotting a course traversed on foot while hunting, timber-cruising, mapping or surveying an area, determining distances to inaccessible points on terrain or range-finding; laying off angles, determining the size of areas and solving geometric figures.

Among the objects of the present invention is to provide a plotting device which is light in weight and compact.

Another object is to provide a plotting disc that has a stationary, unobstructed plotting surface.

A further object is to provide a plotting device having a rotatable graph disc which may be rotated without obstructing the plotting surface.

Another object is to provide a plotting disc of waterproof construction which is economical to manufacture and which is readily portable.

With these and various other objects in view, the invention may consist of certain novel features as will be more fully described and particularly pointed out in the specification, drawings and claims appended hereto.

In the drawings, which illustrate an embodiment of the invention and wherein like reference characters are used to designate like parts—

Figure 1:
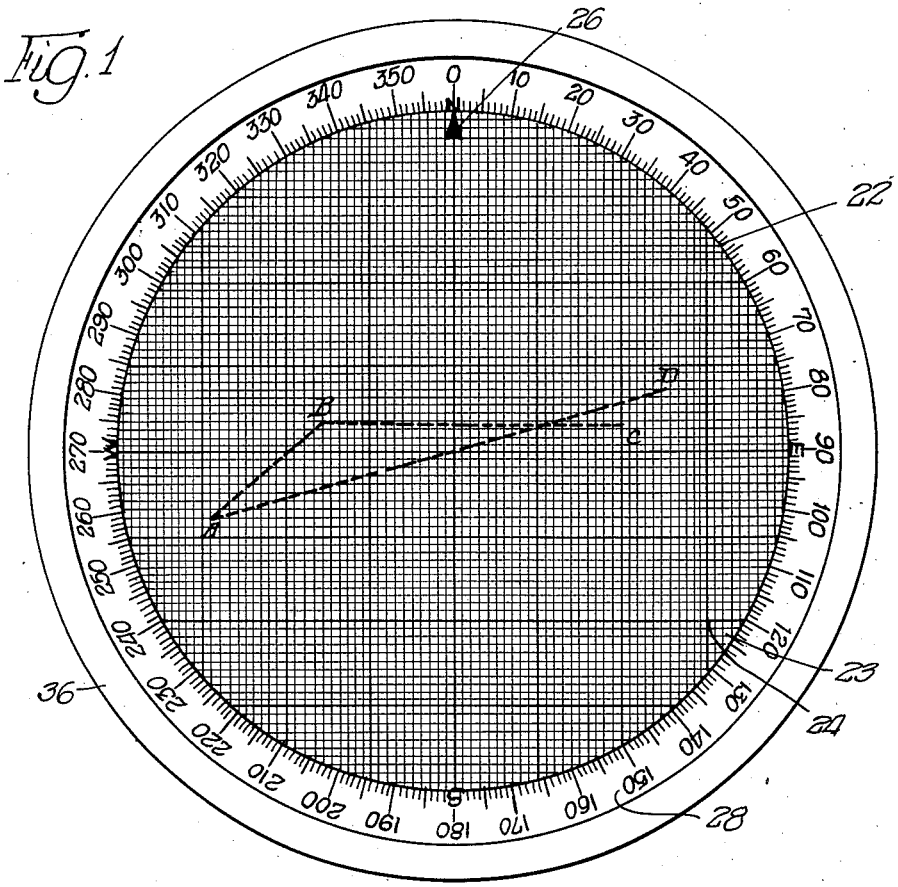
Figure 1 is a top plan view of a device embodying the invention.
Figure 2:
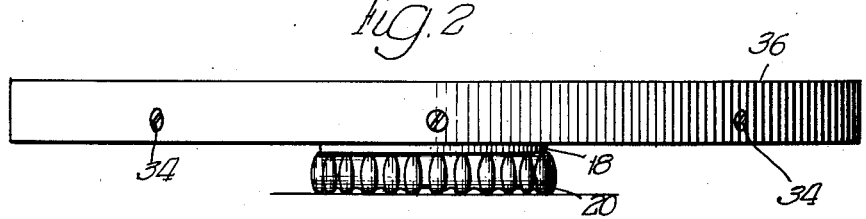
Figure 2 is an elevation of the device shown in Figure 1.
Figure 3:
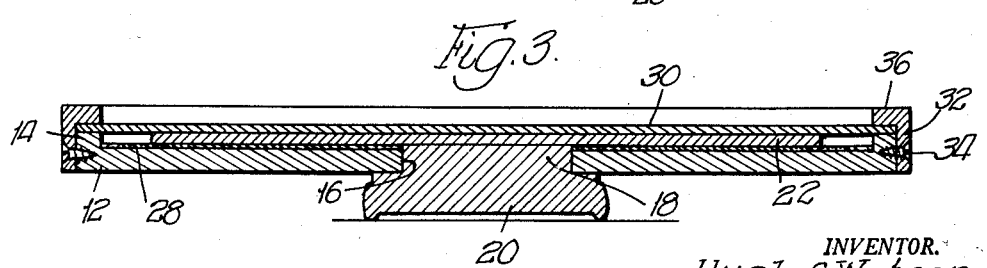
Figure 3 is an elevation in cross section of the device shown in Figures 1 and 2.

Referring more in detail to the drawings, the plotting device has a flat circular base member 12 provided with an upstanding flange 14 and having a centrally disposed opening 16 through which the shank 18 of the operating knob 20 is inserted.

A plastic graph disc 22 is mounted in axial alignment on shank 18 and is adapted to be manually rotated by knob 20. In the embodiment illustrated, the graph is graduated in squares of one-tenth of an inch indicated at 23 and having the one inch squares emphasized by heavier lines as at 24. A center line of the disc is marked with an indicating arrow 26 at one end which is movable with the disc.

A compass dial 28 is mounted on the base 12 and its periphery, which is adjacent flange 14, is graduated from 0 to 360°. The circumference of the overlying disc 22 being less than that of the dial 28, the graduations on the latter may be read from above the disc.

A circular plastic plate or plotting surface 30 is seated on the flange 14 of the base 12. That portion of the surface which overlies the graph disc 22 is etched or frosted or otherwise treated to receive pencil marks and through which the squares on the graph disc are clearly visible. The marginal portion that overlies the graduations on the dial 28 is clear and transparent so that the graduations may be easily observed.

A rim 32 is secured to the periphery of base member 12 and flange 14 by screws 34 and has a horizontal flange 36 which overlies the margin of plotting surface 30, holding it in seated position on flange 14. Plotting surface 30 is so held on base member 12 by rim 32 that a waterproof seal is made between the members.

In operation, the device may be held in one hand adjacent rim 32 and graph disc 22 by means of knob 20 may be rotated with the other hand which is underneath and in no way obstructs the view of the plotting surface, graph disc or graduations. The use and application of the device may be better understood if an example of plotting a course in a small sailboat were given.

Sailboats sometimes require frequent changes of course in order to navigate from one point to another fixed point since they cannot sail directly into the wind. The plotting disc used in conjunction with the boat's speedometer or log and a watch or chronometer simplifies not only the marking down of the course followed, but the plotting of a course to be sailed to the best advantage even under the most adverse conditions.

*Example.*—The straight line distance from Chicago to St. Joseph, Michigan by chart is 56 statute miles on an azimuth or clockwise angular measurement from north of 74°. With the plotting disc, using knob 20 index arrow 26 on graph disc 22 is turned to 74° indicated on dial 28. On graph disc 22, 56 miles may be represented by five one inch squares and six one-tenth inch squares. Starting at the first heavy transverse line crossing the lower end of index arrow line 26, a pencil dot A is made on the plotting surface 30 to indicate the starting point, Chicago. Counting off five one inch squares and six one-tenth inch squares along the arrow line 26 on graph disc 22, another pencil dot D is placed on plotting surface 30 to indicate the destination, St. Joseph. The two dots are then connected by a pencil line which represents the straight line course between Chicago and St. Joseph drawn to scale with the correct azimuth alignment. If it should develop, however, that the nearest course to 74° that the wind would permit the boat to sail was 50°, the index arrow 26 is turned to 50° and a line drawn on plotting surface 30 from the point A representing Chicago parallel to index line 26.

If after sailing along this line it is calculated by speedometer and watch that 18 miles have been covered along this 50° course, a dot B is placed on the line eighteen small squares from the point designated as Chicago. If it is then found that the wind will permit the boat to be sailed with the compass reading 90°, the graph disc 22 is rotated by knob 20 so that arrow 26 is on the 90° calibration on dial 28. A line is then drawn from dot B parallel to arrow line 26 and across the original straight line course from Chicago to St. Joseph.

In order to determine the distance to be sailed on this tack, the index arrow 26 is turned back to 50° and a line is plotted along a line parallel to the index line and which passes through St. Joseph. This line intersects the course just plotted from point B at a point thirty-five squares from B, indicating a distance of 35 miles and a dot C is placed at the intersection.

As the boat approaches point C if it is found that the wind has gone a little south and that a course of 51° may be sailed, the index arrow is turned 51°. The distance to be sailed on this course to reach St. Joseph is 6½ miles as indicated by the six and one-half squares between point C and St. Joseph. This last line may be plotted on arrival.

It is apparent that boats powered by means other than sail can follow a straight course, winds, tides, currents and other factors permitting and being taken into consideration by the navigator when possible. The plotting disc will show both the course followed and indicate that to be followed to the best advantage, as well as giving the boat's present position with time piece and speed indicator to help.

Similarly, the course may be plotted of a land vehicle over any kind of terrain with or without existing roads. Using the speedometer on the vehicle to determine the length of each course travelled and the compass to determine the direction, the courses can be laid out on the plotting disc to the scale desired. The position of the vehicle in respect to the starting point, or any succeeding point, can be immediately ascertained by inspection of the lines drawn on the plotting disc. Distances and directions from any position occupied by the vehicle to any other point on the traverse may be read from the graph surface 22 and indicating dial 28.

The plotting disc may be used for laying off angles, determining areas and solving geometric and trigonometric figures. The figures may be layed out to scale on the plotting surface 30 and, by means of the knob 20, the graph disc 22 with indicating line 26 may be rotated to determine the azimuth of each line or side of the figure. The squares 22 and 24 may be counted to determine distances and areas.

In the foregoing description of the operation of the plotting disc, where it is stated that a line passes through two of the dots, a line of the graph disc may not necessarily pass directly through the center of the dot, but refers to the nearest line.

It is to be understood that the invention is not to be limited by the exact embodiment shown, which is merely by way of illustration and not limitation, as various other forms will be apparent to those skilled in the art without departing from the spirit of the invention or the scope of the claims.

I claim:

1. In a device of the character described, a base member having a centrally disposed aperture and an upstanding peripheral flange, a disc mounted on said base member in fixed relation thereto having its periphery graduated in degrees from 0° to 360° and having a centrally disposed aperture, a shank journalled in said first named aperture, a graph disc mounted in fixed relation on said shank in axial alignment therewith, said last named disc being positioned above said first named disc and having a diameter less than that of said first named disc to permit observation of the graduations on said first named disc from above, said graph disc being divided into uniform squares by a series of lines at right angles and having an indicating line passing through the axis thereof, a transparent member positioned above said last named disc seated on said flange, said member having a circular surface capable of being marked with a pencil in axial alignment with said graph disc and through which said graph disc is visible, the margin of said member being clear and overlying the calibrations on said first named disc, a rim having a vertical portion adapted to be secured to the flange of said base member and a horizontal portion adapted to engage the margin of said transparent member and means positioned below said base member for rotating said shank.

2. In a device of the character described, a base having an aperture, a graduated member mounted on said base in fixed relation thereto and having an aligned aperture, said member having graduations from 0° to 360° disposed in a circle in axial alignment with said aperture, a shank journalled in said first named aperture, a graph disc positioned above said graduated member having a diameter less than that of said circle of graduations and having its periphery immediately adjacent said graduations, said disc being mounted on said shank in axial alignment therewith and being divided into uniform squares by a series of lines at right angles and having an indicating line extending across the disc and passing through the axis thereof, a plotting surface secured to said base in fixed relation positioned above said disc and having a circular portion in axial alignment with said disc capable of being marked with a pencil and through which said graph disc is visible, and means positioned below said base for rotating said shank.

3. In a device of the character described, a base having graduations from 0° to 360° thereon arranged in a circle, an aperture in said base axially disposed with respect to said circle, a shank journalled in said aperture, a graph disc positioned above said base secured in axial alignment to said shank in fixed relation thereto having a diameter less than that of said circle and having its periphery adjacent said circle, said disc being divided into uniform squares by a series of lines at right angles and having an indicating line passing through the axis thereof and readable on said graduations, a plotting surface positioned above said disc having a portion capable of being marked with a pencil through which the lines on said disc are visible, means for securing said surface to said base and means positioned below said base for rotating said shank.

HUGH C. WATSON.

REFERENCES CITED

The following references are of record in the file of this patent:

UNITED STATES PATENTS

| Number | Name | Date |
|---|---|---|
| 1,285,279 | McCabe | Nov. 19, 1918 |
| 2,007,986 | Sprague | July 16, 1935 |
| 2,114,652 | Dalton | Apr. 19, 1938 |
| 2,129,395 | Anderson | Sept. 6, 1938 |
| 2,364,731 | Luck | Dec. 12, 1944 |
| 2,407,893 | Meyer | Sept. 17, 1946 |
| 2,485,674 | Suiter | Oct. 25, 1949 |